United States Patent
Sloan

(10) Patent No.: US 9,569,885 B2
(45) Date of Patent: Feb. 14, 2017

(54) TECHNIQUE FOR PRE-COMPUTING AMBIENT OBSCURANCE

(71) Applicant: NVIDIA CORPORATION, Santa Clara, CA (US)

(72) Inventor: Peter-Pike Johannes Sloan, Sammamish, WA (US)

(73) Assignee: NVIDIA Corporation, Santa Clara (*) Notice: Subject to any disclaimer, the term of this patent is extended or adjusted under 35 U.S.C. 154(b) by 36 days.

(21) Appl. No.: 14/146,667

(22) Filed: Jan. 2, 2014

(65) Prior Publication Data

US 2015/0187129 A1 Jul. 2, 2015

(51) Int. Cl.
*G06T 15/60* (2006.01)
*G06T 1/60* (2006.01)

(52) U.S. Cl.
CPC ........ *G06T 15/60* (2013.01); *G06T 1/60* (2013.01)

(58) Field of Classification Search
USPC ......................................................... 345/426
See application file for complete search history.

(56) References Cited

U.S. PATENT DOCUMENTS

| | | | |
|---|---|---|---|
| 6,774,895 B1* | 8/2004 | Papakipos et al. | 345/422 |
| 7,538,766 B2* | 5/2009 | Zhou et al. | 345/426 |
| 8,390,621 B2* | 3/2013 | Holmdahl | 345/426 |
| 8,542,231 B2* | 9/2013 | Kaplanyan | 345/426 |
| 8,847,958 B2* | 9/2014 | Holmdahl | 345/426 |
| 8,878,849 B2* | 11/2014 | Dimitrov et al. | 345/426 |
| 2003/0112237 A1* | 6/2003 | Corbetta | 345/426 |
| 2007/0013696 A1* | 1/2007 | Desgranges et al. | 345/426 |
| 2008/0143721 A1* | 6/2008 | Liou et al. | 345/426 |
| 2009/0153557 A1* | 6/2009 | Dimitrov et al. | 345/426 |
| 2015/0042651 A1* | 2/2015 | Dwyer | 345/426 |
| 2015/0084958 A1* | 3/2015 | Holmdahl | 345/426 |

* cited by examiner

*Primary Examiner* — Kimbinh T Nguyen
(74) *Attorney, Agent, or Firm* — Artegis Law Group, LLP

(57) ABSTRACT

One embodiment of the present invention includes techniques for pre-computing ambient shadowing parameters for a computer-generated scene. A processing unit retrieves a reference object associated with the computer-generated scene and comprising a plurality of vertices. For each vertex in the plurality of vertices, the processing unit computes a local ambient shadowing parameter, and stores the local ambient shadowing parameter in a memory. For each instance of the reference object included in the computer-generated scene, the processing unit computes a first global ambient shadowing parameter based on the position of the instance within the computer-generated scene, and stores the first global ambient shadowing parameter in the memory. One advantage of the disclosed embodiments is that ambient obscurance is applied to instance objects in a scene in real time while reducing memory space dedicated to storing the AO parameters.

21 Claims, 7 Drawing Sheets

TECHNIQUE FOR PRE-COMPUTING AMBIENT OBSCURANCE

BACKGROUND OF THE INVENTION

Field of the Invention

Embodiments of the present invention relate generally to computer graphics and, more specifically, to an improved technique for pre-computing ambient obscurance.

Description of the Related Art

Rendering realistic scenes for computer-generated films and games typically involves computing accurate global illumination for each object in the scene. This computed global illumination information results in an accurate portrayal of lighting and shadow information resulting from objects blocking ambient light sources and casting shadows on each other. Computing a complete global illumination model may be computationally intensive. As such, real-time performance with a full global illumination model is difficult to achieve, particularly on gaming consoles. Accordingly, approximation models have been developed that approximate a full global illumination model with reasonable accuracy. Computing such approximation models is less computationally intensive than computing a full global illumination model.

One such approximation model is ambient obscurance (AO), which models a uniformly lit scene where occluding objects block a portion of the light from surrounding objects. In the AO model, this occluding characteristic diminishes as a function of the distance between the occluding object and the occluded object. AO parameters may be pre-computed or "baked" in advance and attached to the vertices of the various polygons that form the objects in the scene. During playback, such as during the play of a computer-generated game sequence, these baked, per-vertex AO parameters are retrieved by a graphics processing unit (GPU) during the scene rendering process. The AO parameters are used to rapidly compute lighting information for each polygon with real-time performance.

One drawback to the above approach is that the memory consumed for storing these AO increases with scene complexity. For example, if a scene file includes 3,000 objects with 10,000 vertices per object, then storing four AO parameters per vertex would increase the memory storage of the scene by 4×3,000×10,000=120 million parameters. Another drawback to the above approach is that when a pre-baked AO model is applied to a dynamic object, the lighting is static and does not update as the object moves over time. As a result, the light and shadow cast on the dynamic object looks incorrect as the object moves.

Accordingly, what is needed in the art is a more effective approach to pre-computing ambient obscurance parameters.

SUMMARY OF THE INVENTION

One embodiment of the present invention sets forth a method for pre-computing ambient shadowing parameters for a computer-generated scene. The method includes retrieving a reference object associated with the computer-generated scene and including a set of vertices. The method further includes for each vertex in the set of vertices, computing a local ambient shadowing parameter, and storing the local ambient shadowing parameter in a memory. The method further includes for each instance of the reference object included in the computer-generated scene, computing a first global ambient shadowing parameter based on the position of the instance within the computer-generated scene, and storing the first global ambient shadowing parameter in the memory.

Other embodiments include, without limitation, a computer-readable medium that includes instructions that enable a processing unit to implement one or more aspects of the disclosed methods, and a computing device configured to implement one or more aspects of the disclosed methods.

One advantage of the of the disclosed approach is that AO is applied to instance objects in a scene in real time while reducing memory space dedicated to storing the AO parameters. Another advantage of the disclosed approach is that AO is applied to dynamic objects, while reducing artifacts associated with such dynamic objects.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
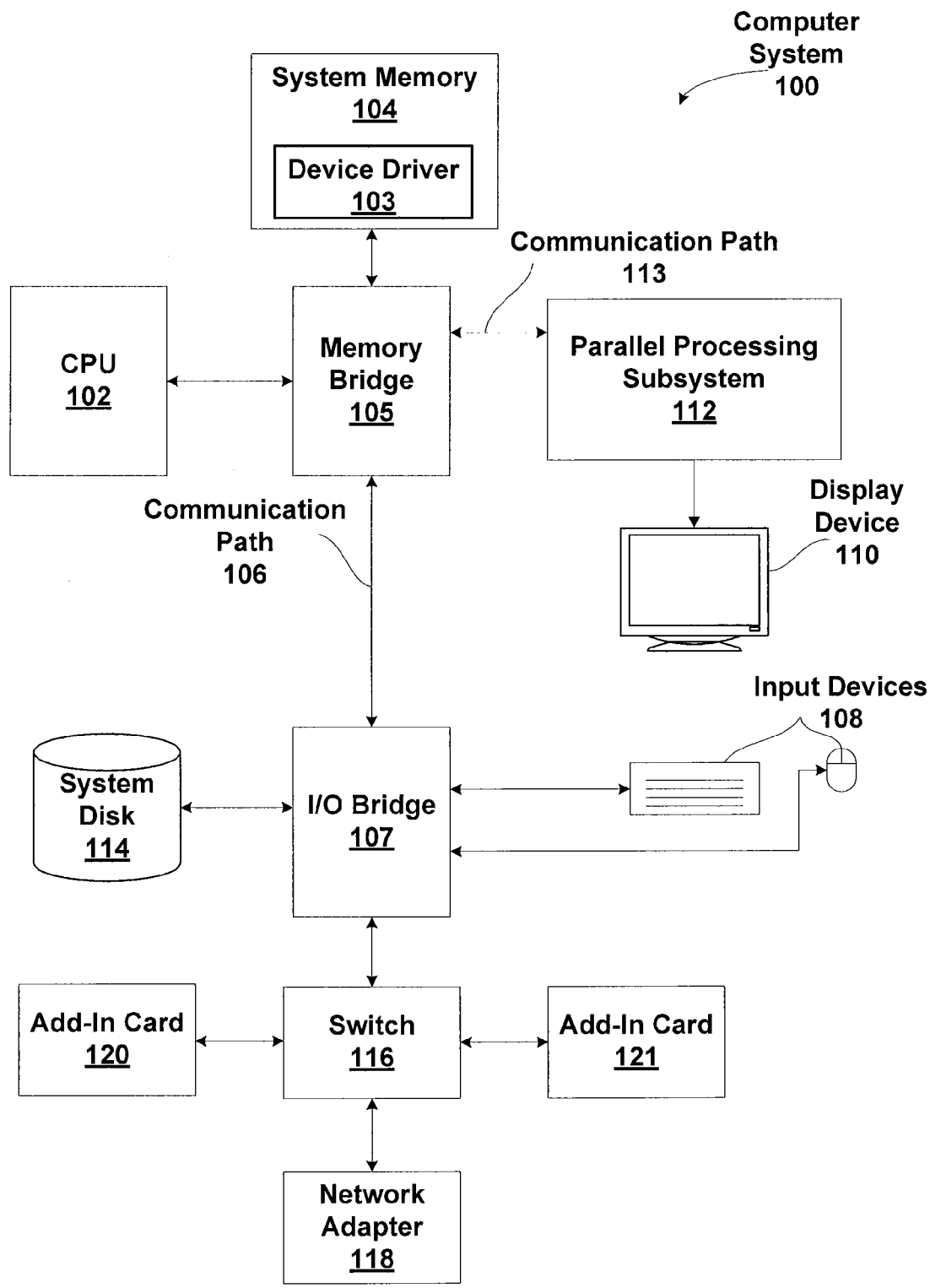
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
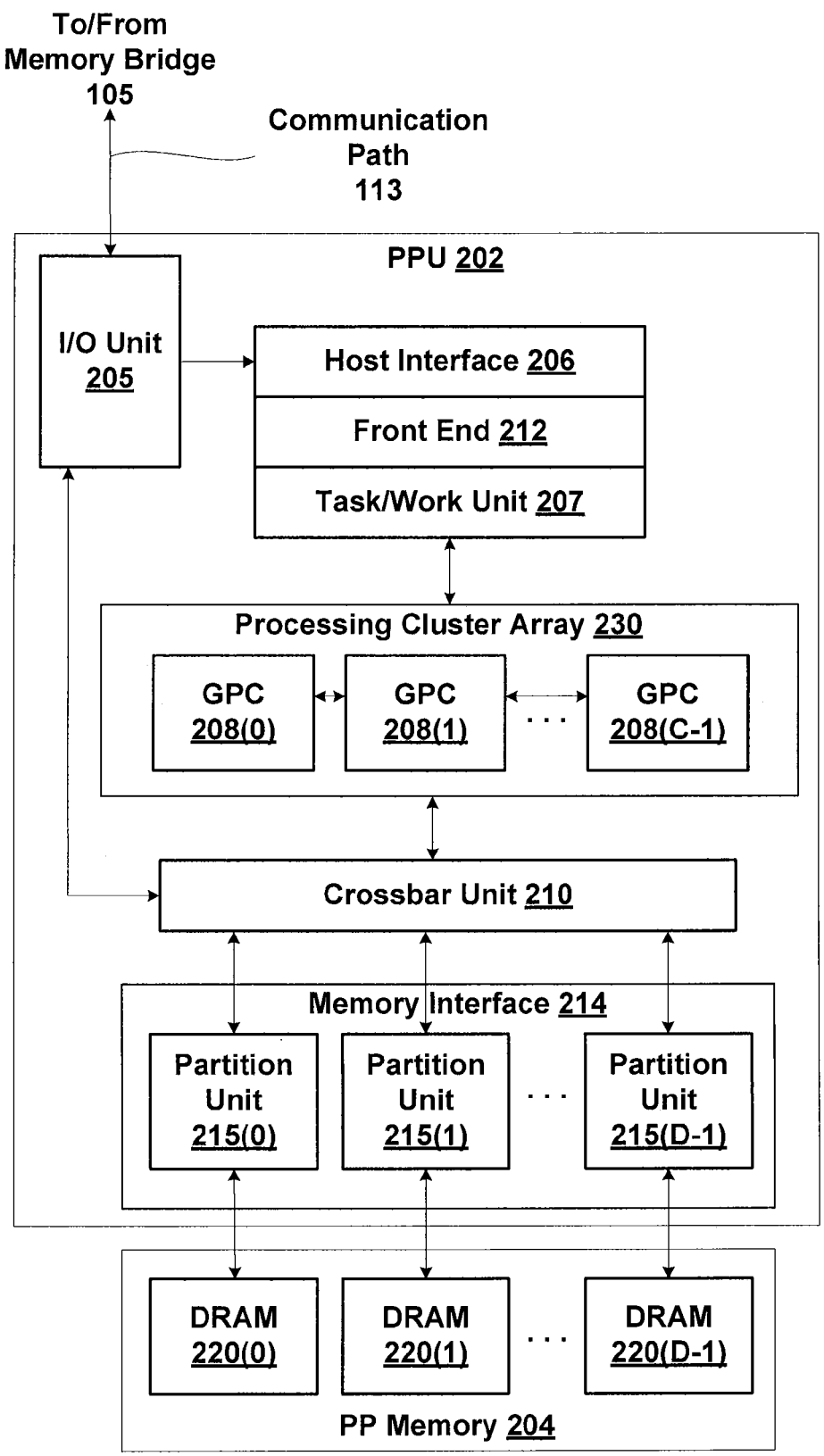
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Pre-Computing Ambient Obscurance

Ambient obscurance (AO) is applied to objects in a scene by combining global AO parameters related to a reference or model object with local AO parameters related to a specific instance of the object in the scene. The local AO parameters are pre-computed and attached to each vertex of the model object. The global AO parameters are pre-computed and attached to the individual instances of the object. At run-time, the pre-computed global AO parameters and local AO parameters are combined by a run-time engine, such as a vertex shader program executing in one of the GPCs 208 of FIG. 2.

Figure 3A:
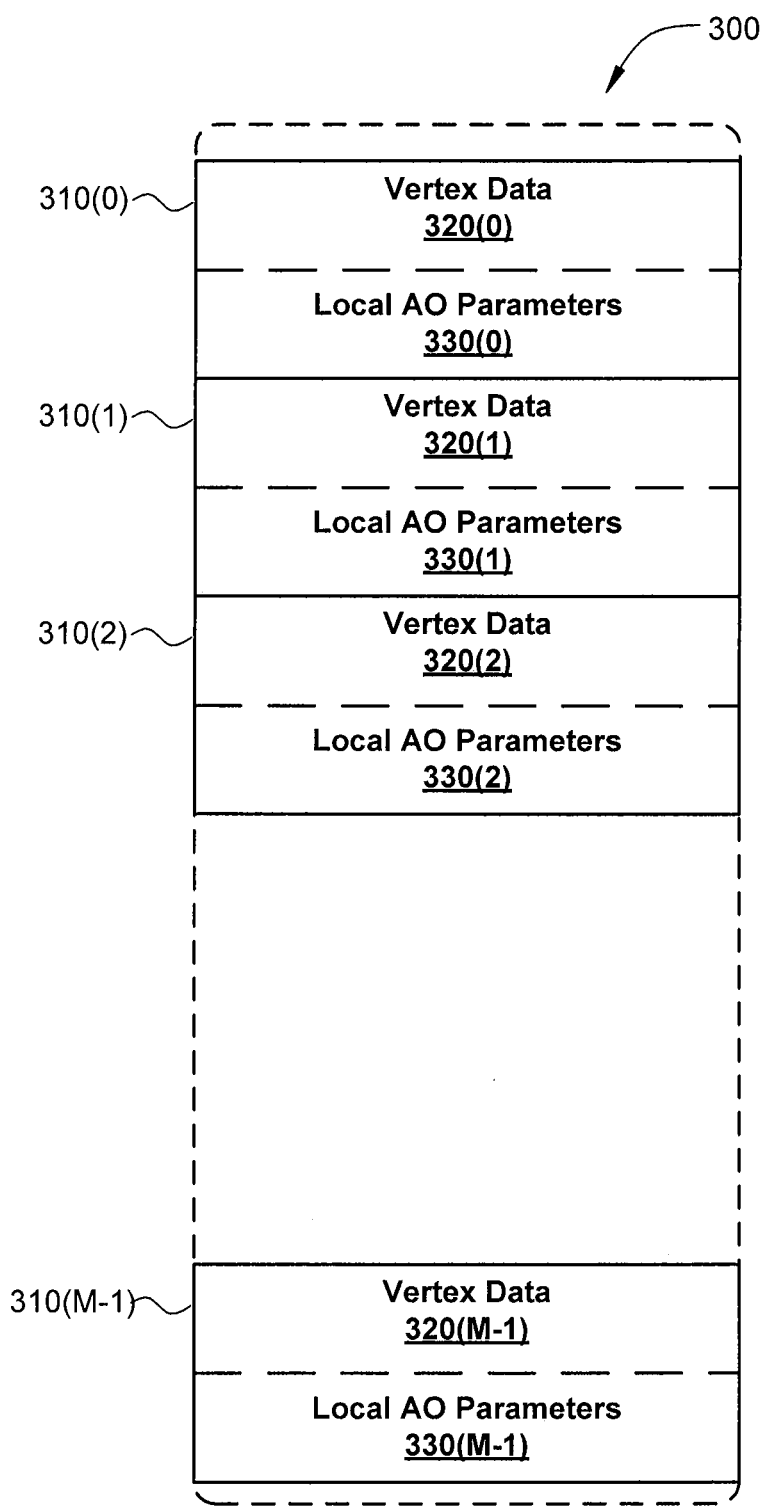
FIG. 3A illustrates a model object vertex array, according to one embodiment of the present invention.

FIG. 3A illustrates a model object vertex array 300, according to one embodiment of the present invention. As shown, the model object vertex array 300 includes vertex elements 310, each of which includes vertex data 320 and local AO parameters 330.

The vertex elements 310 include the data and parameters related to each of the vertices associated with the corresponding object model. As shown, the model object vertex array 300 includes M vertex elements 310 numbered from vertex element 310(0) to vertex element 310(M-1). Accordingly, the model object represented by the model object vertex array 300 includes M vertices.

The vertex data 320 includes parameters and attributes defining the corresponding vertex in the object model. Such parameters and attributes include, without limitation, position, color, transparency, and normal vector information. The local AO parameters 330 include pre-computed AO parameters that relate to the model object in isolation, that is, related to the object itself and not to placed instance of the object within the scene, as further described below.

Figure 3B:
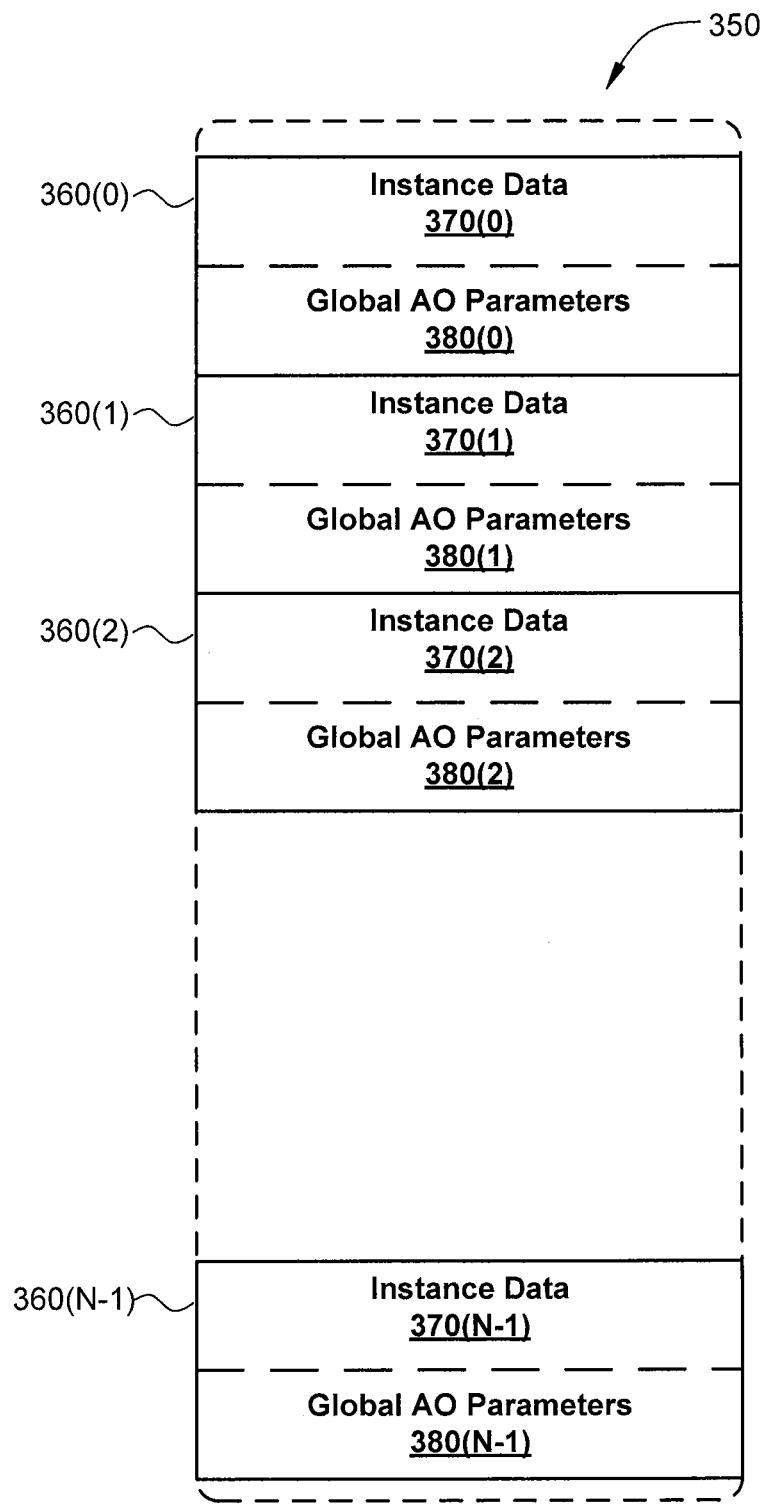
FIG. 3B illustrates an instance object descriptor, according to one embodiment of the present invention.

FIG. 3B illustrates an instance object descriptor 350, according to one embodiment of the present invention. As shown, the instance object array 350 includes instance elements 360, each of which includes instance data 370 and global AO parameters 380.

The instance elements 360 include the data and parameters related to each of the instances associated with the corresponding object model. As shown, the instance object array 350 includes N instance elements 360 numbered from instance element 360(0) to instance element 360(N-1). Accordingly, the instance object array 350 represents N instances of the corresponding model object.

The instance data 370 includes parameters and attributes defining the corresponding instance of the object model. Such parameters and attributes include, without limitation, model object identifier, position, and orientation information.

The global AO parameters 380 include pre-computed AO parameters that relate to the instance of the model object as placed in the scene, and not to local characteristics of the model object itself, as further described below.

Ambient obscurance is an approximation of full global illumination that uses the distance to the first, or nearest, occluding object that attenuates visibility. Mathematically, AO at a point p may be expressed using the integral expressed in Equation 1 below:

$$AO(p) = \frac{1}{\pi}\int_\Omega \rho(d(p,\omega))\cos\theta d\omega \quad (1)$$

where $d(p, \omega)$ represents the distance between the point p and the nearest occluding object in the direction $\omega$, and $\theta$ is the angle between the direction $\omega$ of a ray directed from the point p to the occluding object and the surface normal at p. The exponential kernel in Equation 1 above may be given as $\rho(x)=1-\exp(ax)$. The parameter a is defined such that at distance d (in meters), the visibility is attenuated by one-half. Resolving the kernel equation with this definition for a results in $a=\log(0.5)/d$. In some embodiments, AO may be computed for two distinct distance targets, such as a near-field AO of 2 meters and a far-field AO of 300 meters, and where the final AO may be a blend of the near-field AO and the far-field AO according to a blend constant specified by a user. In one example, the blend constant could specify a weighting of 97% for the long, far-field AO and 3% for the long, far-field AO. However, any technically feasible blend constant may be used.

In some embodiments, screen space techniques may be used to complement the above approach in that such screen space techniques may provide improved results for scenes that include small scale detail. Typically, these screen space techniques may not provide acceptable results in scenes that include objects with large radii or distant geometric objects.

Per-vertex AO may be pre-computed using a least squares vertex baking technique, based on minimizing the error function E(x) given by Equation 2 below:

$$E(x)=\int_S(f(p)-g_x(p))^2 dp + \alpha\int_S(R_{edge}(p))^2 dp \quad (2)$$

where f is the input ambient obscurance signal, $g_x$ is a piecewise linear approximation of the input ambient obscurance signal, x is the vector of coefficients, that is, the per-vertex AO values, and S is the surface of the scene. The first integral in Equation 2 models the square of the approximation error integrated over the surface, and the second integral is an edge based regularizer term, weighted by a weighting constant $\alpha$. A sparse direct solver may be used to solve the linear system of equations resulting from Equation 1. In some embodiments, a value of $\alpha=1$ may provide acceptable results for typical scenes, although other values of $\alpha$ may be used.

In some embodiments, two modifications may be made to the above-described technique for large scene files. First, scenes may include large, coarsely tessellated geometric objects set at relatively long distances. If AO for such objects is sampled per unit area of the object, the large, distant object may be oversampled, relative to the contribution of the object to the final image. Correspondingly, the playable, or viewable, area of the scene may be under-sampled. Accordingly, a maximum number of samples per face or per polygon may be specified, resulting in each object being sampled according to an appropriate weighting level. As a result more samples may be focused in the playable or viewable area.

Second, when tracing rays during AO pre-computation, the nearest hit of the ray may be computed at each surface location, where the ray be front-facing, and therefore visible, geometry or back facing, and therefore not visible, geometry. If the number of rays hitting back facing geometry is above a given threshold, such as 25%, then the sample may be invalidated. Such an approach may be more robust then using a threshold based on the AO value at the surface location.

Objects that are heavily replicated, or instantiated, such as objects representing ground cover or trees, may significantly increase the time and memory needed to compute and represent the scene bounding volume hierarchy. Such heavily replicated objects are known as instance objects or decorator objects. For example, the time to build a bounding volume hierarchy could increase by about 30 seconds for a medium-sized scene that includes such objects. In addition, direct instantiation of instance objects may lead to aliasing due to low sampling densities.

To alleviate this issue, a two-step approach may be used, where two rays are "shot" from the object. First, an opaque ray may be shot to calculate the base obscurance. Second, an additional ray may be shot from the origin to a point representing an intersecting location where the ray intersects a second bounding volume hierarchy that includes only the bounding boxes of the instance objects. Each instance object may have a density and exponential attenuation factor that may be used to modify the obscurance multiplicatively, computing the length of the intersection of a ray and a given bounding box. In a pre-processing step, the amount of overlap between a bounding box and the rest of the instance object bounding boxes is computed, thereby reducing the density. As a result, the object visibility does not overly decrease where bounding boxes overlap. This approach generates a smoother and more pleasing AO result in the scene.

Instance objects, such as trees, may be treated as semi-transparent objects, where each intersection attenuates visibility by a given factor, such as 50%, and are in the same bounding volume hierarchy as other instance objects, such as shrubs. Both classes of instance objects may attenuate the current AO value for a ray. This approach may result in a decrease in visibility as the intersection interval increases. Such an approach is contrasted with the exponential attenuation involved in ambient obscurance, as reflected in Equation 1, where visibility may increase as the length a ray moves through free space increases.

Storing per-vertex AO for all instances of the instance objects may consume more memory than is available for certain systems, such as gaming consoles. Accordingly, a more compact representation may reduce the memory consumed by instance object AO. Instance objects may be divided into two classes: (1) large instance objects, exemplified by trees; and (2) small instance objects, exemplified by grass clumps and bushes. The geometry related to trees are typically not well-formed, including poorly calculated normal vectors, complex interpenetrations of internal geometry primitives, and geometry primitives with improperly defined back faces. To alleviate these problems, the regions around the trees may be volumetrically sampled using a fixed target sampling density and tri-linear interpolation to generate AO at the vertices of the volumetric elements (voxels). A two-level sparse volume texture may be created, such that samples inside the volume of a tree instance may have eight valid samples for use in tri-linear interpolation. In addition, each valid voxel has a spherical visibility function that represents AO at two distances using quadratic spherical harmonics. Spherical samples are pre-computed in a manner similar to surface samples. This volume data is used to reconstruct values at object vertices, where four floating point values may represent the AO at a given vertex.

For every exemplary instance object model, a "local AO" is computed by pre-computing the object model in isolation, that is, where the local AO takes only the object itself into account, and not information related to individual instances of the object model. For each instance of the object model, a "global AO" is then calculated, which takes into account the AO contribution due to the placement of a particular instance in the scene. The global AO component may be compact. For example, a global AO component based on a 3D linear function may be used to generate scalar coefficients per instance. As a result, the local AO captures details due to the geometry of the object model, and the global AO captures the effect based on the surrounding scene geometry. Specifically, the parameters y of the global AO function $G_y$ may be computed by solving the optimization problem for each object instance, as given by Equation 3 below:

$$\min_y \sum_i (f(s_i) - G_y(s_i)L(T_j s_i))^2 \qquad (3)$$

where $s_i$ represents the world-space surface samples on the specific object instance, $f(s_i)$ is the complete AO value for the instance, $G_y$ is the linear function of the global AO, L is the pre-computed local AO for the object model, and $T_j$ is a matrix which converts the coordinates of sample $s_i$ from the world space to the object space. Solving Equation 3 for the global AO $G_y$ involves resolving a linear least-squares-problem with four unknowns, representing the four global AO parameters.

For small instance objects, such as grass clumps, a single scalar may be sufficient to store the global AO. In the case of small instance objects, a mapping that roughly resamples and matches the instance to the surrounding terrain may provide sufficient detail. This resampling may be accomplished by forming a small sphere around a point on the geometry of the small instance object. Rays are then shot from the boundary of the small sphere toward the center of the sphere. The resulting AO values are then weighted based on the distance from the point of contact to the boundary of the sphere, and combined to form a final AO scalar for the small instance object. The approach may also be used to resample the AO onto lower level-of-detail (LOD) models of the scene, where resampling over the surfaces and performing a least-squares-fit produces better results than resampling at the object vertices.

As described above, AO may be applied to large quantities of instance objects, with a reduced consumption of memory space. AO may also be applied to dynamic objects by attaching AO parameters to visibility regions related to the dynamic objects. Artifacts are reduced by combining the AO model with a regularizing term that smoothes transitions based on neighboring regions and based on the model used in the prior frame.

Figure 4:
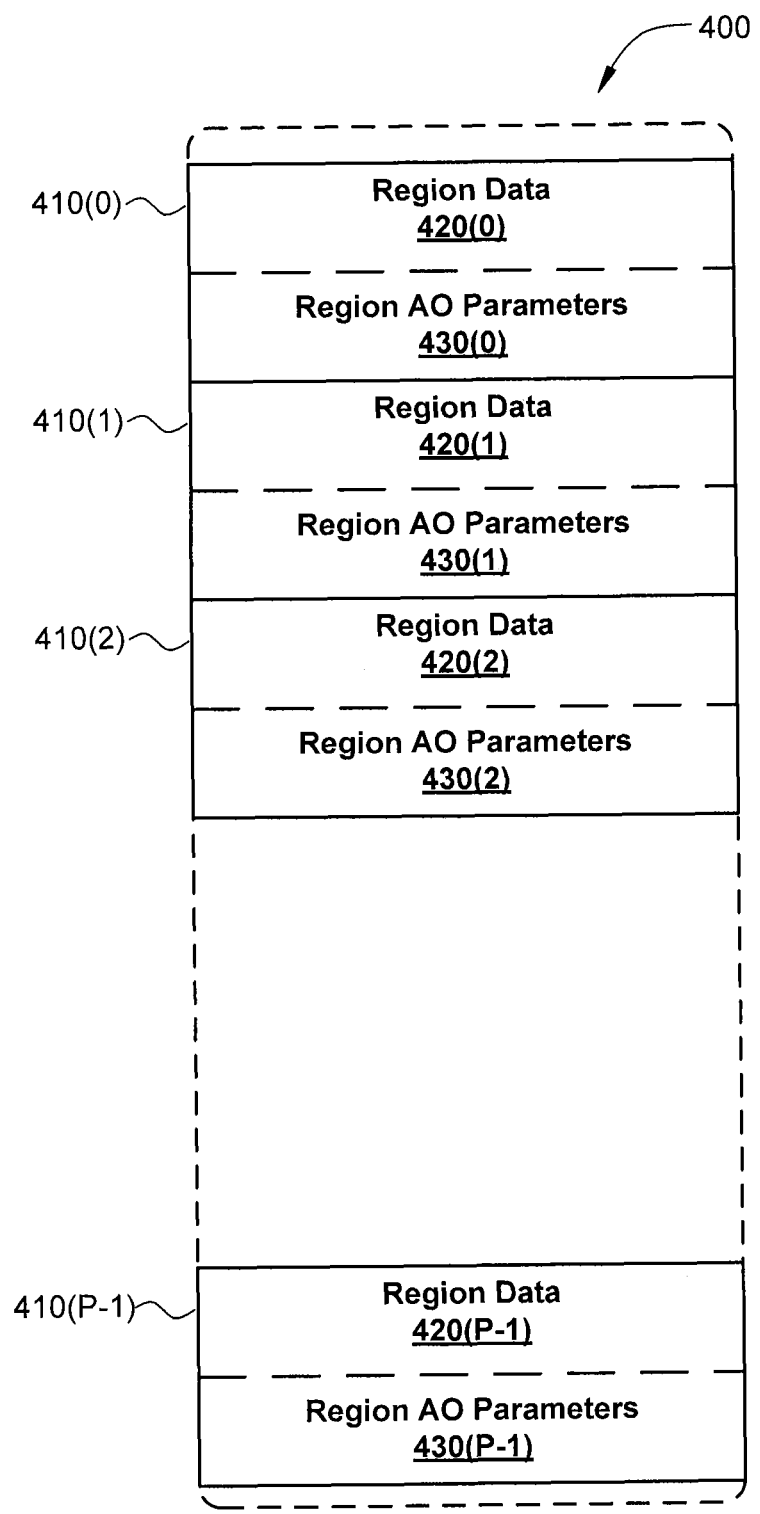
FIG. 4 illustrates a dynamic object descriptor, according to one embodiment of the present invention.

FIG. 4 illustrates a dynamic object descriptor 400, according to one embodiment of the present invention. As shown, the dynamic object descriptor 400 includes region elements 410, each of which includes region data 420 and region AO parameters 430.

The region elements 410 include the data and parameters related to each of the regions associated with the corresponding dynamic object. As shown, the dynamic object descriptor 400 includes P region elements 410 numbered from region element 410(0) to region element 410(P-1). Accordingly, the dynamic object represented by the region elements 410 includes P regions.

The region data 420 includes parameters and attributes defining the corresponding region in the dynamic model. Such parameters and attributes include, without limitation, position information, and connectivity information that defines how the region connects to neighboring regions. The region AO parameters 430 include pre-computed AO parameters that relate to the corresponding region of the dynamic model. The region AO parameters define an AO model for any point in the corresponding region, such as a function that computes spherical AO as a function of position within the region.

In some embodiments, the set of scene files is associated with a visibility system that provides a set of coarse visibility regions, where the visibility regions are represented as axis-aligned boxes and a graph representing the connectivity among the axis-aligned boxes. The system executing the application, such as the gaming console, uses this visibility system for run-time culling, such as during rendering. Additional information may be stored in the visibility regions, where the additional information corresponds to an AO model for dynamic objects. These visibility regions may be conservatively defined and often overlap. As a result, sampling inside visibility regions, without examining overlapping regions, may causes artifact due to visibility bleeding between neighboring visibility regions. However, the visibility system may be capable of determining whether a given point on the dynamic object that is inside a visibility region is actually considered to be visible, that is, not on the other side of a diagonal wall, or buried inside a wall. Before beginning AO pre-computation, a one-bit flag is computed for each visibility region of 8×8×8 samples, such that the one-bit flag is set if the given point is valid, that is, visible. The spherical obscurance functions are sampled at each of the valid points by convolving the spherical obscurance functions with a clamped cosine function to generate the AO for any input normal.

The process described above may generate a significant amount of AO data, such that the run-time system may not have sufficient storage for all of the dynamic object AO information. Accordingly, a more compact AO model may be computed for each visibility region. First, points that have visibility to more than a threshold number of back facing objects may be eliminated. Such points are likely to be inside an object. Second, an AO model is solved for each visibility region, where the model includes a center point c and six directional derivatives, two directional derivatives in each of the x-axis, y-axis, and z-axis, relative to the center point c. Mathematically, this model may be expressed using Equation 4 below:

$$AO_{dynamic}(p) = v_{mean} + \sum_{i=0}^{2}(p-c)_i v_{2i+s_i} \quad (4)$$

where $p \in R^3$ is a query point in world space, $v_{mean}$ is a constant term, c is the center point of the model, $v_{2i+s_i}$, or more generically, $v_j$, is a singly indexed array of vectors that represents the six directional derivatives (+x, −x, +y, −y, +z, −z in this order), and $s_i$ is 0 or 1 depending on the sign of $(p−c)_i$. $(p−c)_i$ represents component i of the 3D vector (p−c). This model is non-linear because of the center point. However, for a fixed center point, the seven remaining parameters may be solved using a linear least-squares approach.

In some embodiments, sufficient detail may be obtained by solving for two candidate centers: the center of mass of the valid samples in the region and the geometric center of the visibility region, rather than optimizing the entire model using a non-linear solver. The dynamic mode AO is solved once, and the result is applied to each of the eighteen channels of the quadratic spherical harmonics at two distances, a near-field distance and a far-field distance. The seven degrees of freedom (center plus six directional derivatives) in the model expressed by Equation 4 provide sufficient degrees of freedom such that a six-wall room is well represented, where the center of the room has high visibility, and AO causes the scene to darken as the camera moves towards any of the six walls. The final AO coefficients are stored for each region in the region AO parameters 430 of the corresponding region element 410.

In some embodiments, AO for a dynamic object may be sufficiently modeled with linear spherical harmonics and a single function, such as a cosine function, which reduces computation and memory storage in the vertex shader of the GPC 208 and correspondingly reduces accuracy. Even so, for a single occluding plane, such as a ground plane or floor, AO convolved with a cosine may be exactly represented with linear spherical harmonics. Such a simplified AO model may be evaluated with a vector difference function and three multiply-add (MAD) instructions, which may be readily vectorized for fast computation by a vector processor.

The AO models may be sampled based on the current position of the moving character or other dynamic object. Without further compensation, this approach may lead to "popping" artifacts when switching between AO models. Two techniques are implemented to reduce such artifacts. First, the models in each cluster are regularized based on how well the models predict neighboring clusters using the connectivity graph. Mathematically, the goal is to minimize the error function given by Equation 5 below:

$$E = \sum_{i \in regions}(M_i - M_{orig,i})^2 + \beta \sum_{j \in N(i)} \omega_{ij}(M_i(b_{ij}) - M_j(b_{ij}))^2 \quad (5)$$

where $M_{orig}$ is the model fit to the region alone, $M_i$ and $M_j$ are the refined model for regions i and j, respectively, β is a weight for regularization, $\omega_{ij}$ is the area of the boundary between regions i and j, and b is a point on the center of this boundary. Note that Equation 5 is related to the regularized least-squares fit as shown in Equation 2, herein. The first summation of Equation 5 is evaluated over all the regions in the visibility system. The second summation of Equation 5 is evaluated over the neighboring regions of region i, denoted as N(i). Rather than solving Equation 5 as a global linear system, a variant of block coordinate descent may be used to move iteratively toward a more balanced model of each region, independently.

While this approach may smooth the differences between neighboring regions, this process may not result in a continuous function over time. Accordingly, a second technique may be applied at run time to temporally blend the AO model over time. Specifically, the visibility model of a given frame is blended with the visibility model for the previous frame. This technique smoothes any temporal popping artifacts using exponential decay. By applying these two techniques together, both spatial and temporal artifacts resulting from AO models applied to dynamic objects may be reduced. In one embodiment, the visibility system may tag each dynamic object with the cluster the dynamic object is in, and indices may be stored that references the world space model for each cluster. These clusters are the same as the visibility regions described herein.

It will be appreciated that the system shown herein is illustrative and that variations and modifications are possible. For example, the techniques are described herein in the context of ambient obscurance. However, these techniques could be applied in an ambient occlusion context, within the scope of the present invention, where ambient occlusion is an alternative coarse approximation to global illumination from ambient lighting, based on infinitely distant constant lighting. In another example, the vertex shader within one or more GPCs 208 could evaluate and interpolate the AO results at run-time, and store the results in a suitable memory, including, without limitation, a frame buffer, render target, or geometry buffer (G-buffer). In another example, because AO is an approximation of a full global illumination model, banding could result from applying AO to a scene. Accordingly, a technically appropriate dithering function could be applied to the scene to reduce such banding effects. In yet another example, storage of AO parameters could be further reduced by discovering smaller visibility regions and combining such small visibility regions with the most compatible neighboring region, thereby reducing the total number of regions.

In yet another example, pre-processing performance could be improved by gathering bundles of rays at each sample point. Rays could be re-grouped based on compact cones of thirty-two rays, gathered across a group of parallel threads, and then followed by a reduction pass. Such an approach could improve tracing performance. In yet another example, the instance object AO model could be optimized for the object model local AO using alternating least squares, rather than just computed local AO. In yet another example, a more refined representation of the volumetric model used for dynamic AO could be employed, including optimization of the center point.

Figure 5A:
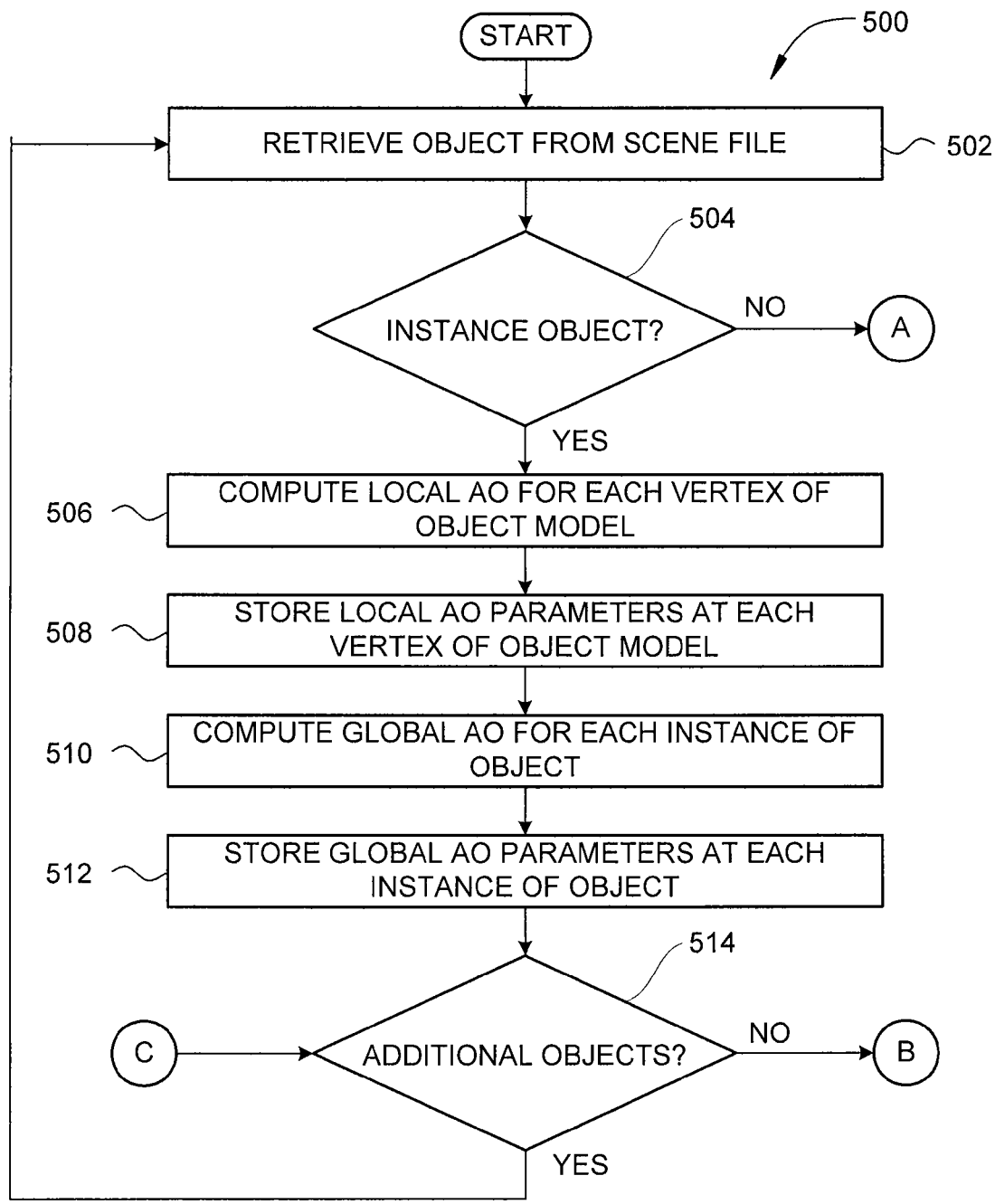
FIGS. 5A-5B set forth a flow diagram of method steps for pre-computing ambient obscurance for objects in a scene, according to one embodiment of the present invention.
Figure 5B:
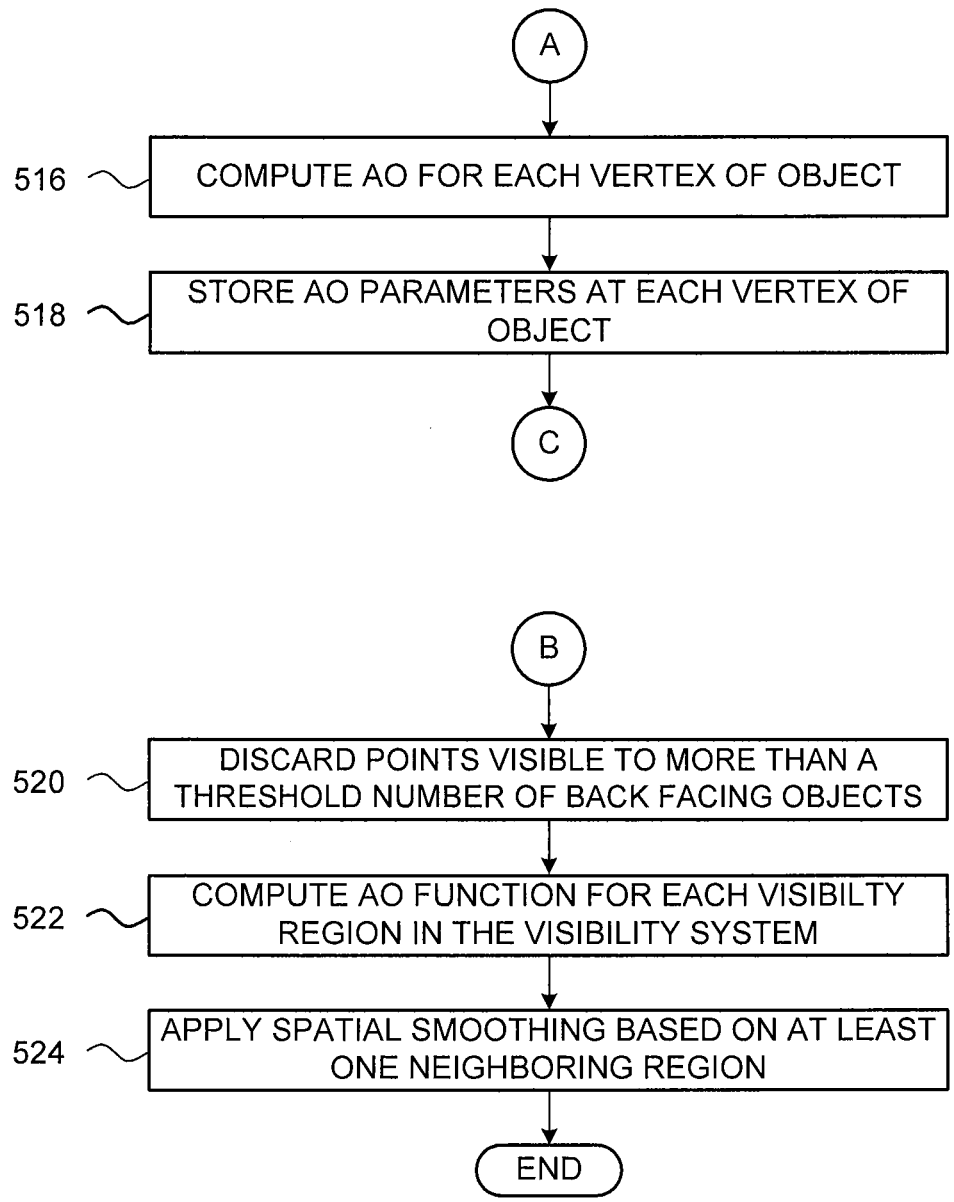

FIGS. 5A-5B set forth a flow diagram of method steps for pre-computing ambient obscurance for objects in a scene, according to one embodiment of the present invention. Although the method steps are described in conjunction with the systems of FIGS. 1-4, persons of ordinary skill in the art will understand that any system configured to perform the method steps, in any order, falls within the scope of the present invention.

As shown, a method 500 begins at step 502, where a processing unit within computing system 100 retrieves an object from a scene file. At step 504, the processing unit determines whether the object is an instance object. If the object is an instance object, then the method 500 proceeds to step 506, where the processing unit computes an AO function for each vertex of the object model corresponding to the instance object. At step 508, the processing unit stores the AO parameters of the AO function at each corresponding vertex of the object model. At step 510, the processing unit computes the global AO parameters associated with each instance of the instance. At step 512, the processing unit stores the global AO parameters associated with each instance in the corresponding instance entry. At step 514, the processing unit determines whether any additional objects remain to be processed. If additional objects remain to be processed, then the method 500 proceeds to step 502, described above.

If, however, no additional objects remain to be processed, then the method 500 then proceeds to step 520, where the processing unit discards points in the visibility system that are visible to more than a threshold value of back facing objects. At step 522, the processing unit computes an AO function for each visibility region in the visibility system. At step 524, the processing unit applies a spatial smoothing function based on an AO function corresponding to at least one neighboring visibility region. The method 500 then terminates.

Returning now to step 504, if the object is not an instance object, then the method 500 proceeds to step 516, where the processing unit computes an AO function for each vertex of the object. At step 518, the processing unit stores the AO parameters of the AO function at each corresponding vertex of the object. The method 500 then proceeds to step 514, described above.

In sum, ambient obscurance (AO) is applied to objects in a scene by combining global AO parameters related to a model object with local AO parameters related to a specific instance of the object in the scene. The local AO parameters are pre-computed and attached to each vertex of the model object. The global AO parameters are pre-computed and attached to the individual instances of the object. At run-time, the pre-computed global AO parameters and local AO parameters are combined by a run-time engine, such as a vertex shader program in a GPU. AO is applied to dynamic objects by attaching AO parameters to visibility regions related to the dynamic objects. Artifacts, associated with model changes as the dynamic object moves and the scene changes, are reduced by combining the AO model with a regularizing term that smoothes transitions based on neighboring regions and based on the model used in the prior frame.

One advantage of the of the disclosed approach is that AO is applied to instance objects in a scene in real time while reducing memory space dedicated to storing the AO parameters. As a result, more realistic visual imagery is achieved even in systems with a relatively small memory space, such as gaming consoles. Another advantage of the disclosed approach is that AO is applied to dynamic objects, while reducing artifacts associated with such dynamic objects. As a result, AO is applied to both static and dynamic objects in the scene, leading to a consistent look and an enhanced visual experience.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A method for pre-computing ambient shadowing parameters for a computer-generated scene, the method comprising:
    retrieving a reference object associated with the computer-generated scene and comprising a plurality of vertices;
    for each vertex in the plurality of vertices:
        computing a local ambient shadowing parameter, and
        storing the local ambient shadowing parameter in a memory; and
    for each instance of the reference object included in the computer-generated scene:
        computing a first global ambient shadowing parameter for the instance based on the position of the instance within the computer-generated scene, and
        storing the first global ambient shadowing parameter in the memory.

2. The method of claim 1, further comprising for each vertex of a first instance of the reference object, computing a composite ambient shadowing parameter based on the local shadowing parameter and the first global shadowing parameter.

3. The method of claim 1, wherein for each instance of the reference object included in the computer-generated scene, the first global shadowing parameter is based on a distance from the instance to a respective nearest occluding object.

4. The method of claim 1, further comprising:
    for each instance of the reference object included in the computer-generated scene:
        determining that a size associated with the instance exceeds a threshold value,
        computing a second global ambient shadowing parameter based on the position of the instance within the computer-generated scene,
        computing a third global ambient shadowing parameter based on the position of the instance within the computer-generated scene,
        computing a fourth global ambient shadowing parameter based on the position of the instance within the computer-generated scene, and storing the second global ambient shadowing parameter, the third global ambient shadowing parameter, and the fourth global ambient shadowing parameter in the memory.

5. The method of claim 1, wherein computing the first global ambient shadowing parameter comprises evaluating the first global shadowing parameter at a first distance between a light source and the instance of reference object, and further comprising:
for each instance of the reference object included in the computer-generated scene:
computing a second global ambient shadowing parameter based on the position of the instance within the computer-generated scene, comprising evaluating the second global shadowing parameter at a second distance between the light source and the instance of reference object, and
storing the second global ambient shadowing parameter in the memory.

6. The method of claim 5, further comprising computing a composite ambient shadowing parameter based on the local ambient shadowing parameter, the first global ambient shadowing parameter, and the second global ambient shadowing parameter.

7. The method of claim 1, wherein for each vertex in the plurality of vertices, the local ambient shadowing parameter is based on a square of a difference between an input ambient obscurance signal and the local ambient shadowing parameter.

8. The method of claim 1, wherein for each vertex in the plurality of vertices, the local ambient shadowing parameter is based on a weighted edge-based regularizer term.

9. The method of claim 1, wherein the position of the instance within the computer-generated scene is relative to one or more other instances of the reference object within the computer-generated scene.

10. A non-transitory computer-readable storage medium including instructions that, when executed by a processing unit, cause the processing unit to perform an operation for pre-computing ambient shadowing parameters for a computer-generated scene, the operation comprising:
retrieving a reference object associated with the computer-generated scene and comprising a plurality of vertices; and
for each instance of the reference object included in the computer-generated scene:
computing a first global ambient shadowing parameter for the instance based on the position of the instance within the computer-generated scene, and
storing the first global ambient shadowing parameter in the memory.

11. The computer-readable storage medium of claim 10, wherein the operation further comprises for each vertex of a first instance of the reference object, computing a composite ambient shadowing parameter based on a local ambient shadowing parameter and the first global ambient shadowing parameter.

12. The computer-readable storage medium of claim 10, wherein for each instance of the reference object included in the computer-generated scene, the first global shadowing parameter is based on a distance from the instance to a respective nearest occluding object.

13. The computer-readable storage medium of claim 10, wherein the operation further comprises:
for each instance of the reference object included in the computer-generated scene:
determining that a size associated with the instance exceeds a threshold value,
computing a second global ambient shadowing parameter based on the position of the instance within the computer-generated scene,
computing a third global ambient shadowing parameter based on the position of the instance within the computer-generated scene,
computing a fourth global ambient shadowing parameter based on the position of the instance within the computer-generated scene, and
storing the second global ambient shadowing parameter, the third global ambient shadowing parameter, and the fourth global ambient shadowing parameter in the memory.

14. The computer-readable storage medium of claim 10, wherein computing the first global ambient shadowing parameter comprises evaluating the first global shadowing parameter at a first distance between a light source and the instance of reference object, and further comprising:
for each instance of the reference object included in the computer-generated scene:
computing a second global ambient shadowing parameter based on the position of the instance within the computer-generated scene, comprising evaluating the second global shadowing parameter at a second distance between the light source and the instance of reference object, and
storing the second global ambient shadowing parameter in the memory.

15. The computer-readable storage medium of claim 14, wherein the operation further comprises computing a composite ambient shadowing parameter based on at least one local ambient shadowing parameter, the first global ambient shadowing parameter, and the second global ambient shadowing parameter.

16. The computer-readable storage medium of claim 10, wherein for each vertex in the plurality of vertices, an associated local ambient shadowing parameter is based on a square of a difference between an input ambient obscurance signal and the associated local ambient shadowing parameter.

17. The computer-readable storage medium of claim 10, wherein for each vertex in the plurality of vertices, an associated local ambient shadowing parameter is based on a weighted edge-based regularizer term.

18. A non-transitory computer-readable storage medium including instructions that, when executed by a processing unit, cause the processing unit to perform an operation for pre-computing ambient shadowing parameters for a computer-generated scene, the operation comprising:
for each visibility region included within the computer-generated scene:
computing a region ambient shadowing parameter based on a dynamic object associated with the computer-generated scene,
modifying the region ambient shadowing parameter based on a corresponding region ambient shadowing parameter from a neighboring visibility region to generate a first modified region ambient shadowing parameter,
modifying the first modified region ambient shadowing parameter based on a region ambient shadowing parameter from a different frame of the computer-generated scene to generate a second modified region ambient shadowing parameter, and storing the second modified region ambient shadowing parameter in the memory.

19. The computer-readable storage medium of claim 18, wherein for each visibility region included within the computer-generated scene, computing the region ambient shadowing parameter comprises:
   generating a plurality of sample points, wherein each sample point in the plurality of sample points intersects with the dynamic object, and
   selecting a subset of sample points from the plurality of sample points, wherein each sample point in the subset of sample points is visible to less than a threshold quantity of back-facing objects.

20. The computer-readable storage medium of claim 18, wherein for each visibility region included within the computer-generated scene, computing the region ambient shadowing parameter further comprises evaluating the region ambient shadowing parameter at a first point representing a center of mass of the sample points in the subset of sample points.

21. The computer-readable storage medium of claim 18, wherein for each visibility region included within the computer-generated scene, computing the region ambient shadowing parameter comprises evaluating the region ambient shadowing parameter at a first point representing a geometric center of the visibility region.

* * * * *

UNITED STATES PATENT AND TRADEMARK OFFICE
CERTIFICATE OF CORRECTION

PATENT NO. : 9,569,885 B2
APPLICATION NO. : 14/146667
DATED : February 14, 2017
INVENTOR(S) : Peter-Pike Johannes Sloan Page 1 of 1

It is certified that error appears in the above-identified patent and that said Letters Patent is hereby corrected as shown below:

On the Title Page

(73) Assignee:
Please delete "NVIDIA Corporation, Santa Clara" and insert --NVIDIA Corporation, Santa Clara, CA (US)--.

Signed and Sealed this
Third Day of October, 2017

Joseph Matal
*Performing the Functions and Duties of the*
*Under Secretary of Commerce for Intellectual Property and*
*Director of the United States Patent and Trademark Office*